Sept. 14, 1965  L. S. KREYER  3,206,741
ANALOG TO DIGITAL CONVERTER
Filed April 18, 1963

LAWRENCE S. KREYER
INVENTOR.

BY Cadwallader And Kelly

ATTORNEYS

United States Patent Office 3,206,741
Patented Sept. 14, 1965

3,206,741
ANALOG TO DIGITAL CONVERTER
Lawrence S. Kreyer, Las Vegas, Nev., assignor to Edgerton, Germeshausen & Grier, Inc., Boston, Mass., a corporation of Massachusetts
Filed Apr. 18, 1963, Ser. No. 274,013
6 Claims. (Cl. 340—347)

This invention relates to converter circuits and more particularly to a circuit for converting the amplitude of an analog voltage to a digital number related thereto.

There are many applications where it is desired to measure the height of a pulse having a fast rise time and a short time duration, by means that give the pulse height in digital form, such as a binary number, so that further operations may be performed. It is obvious that such a binary number can be utilized in various digital equipments and computers. I have devised a circuit that accomplishes this.

It is often desired that very short exponentially rising pulses be sampled, that the pulse height at the time of sampling be measured, and that the measured digital value be utilized in further operations. My circuit samples such a pulse and gives the pulse height at the time of sampling in digital form. In this mode of operation my circuit may be utilized to measure the amplitude of a D.C. voltage.

Accordingly, it is an object of my invention to provide a circuit for measuring in digital form the pulse height of very short pulses.

Another object is to provide a circuit that samples a pulse and measures the pulse height at the time of sampling in digital form.

A further object of my invention is to provide a circuit for converting analog pulse heights to digital values that is simple and inexpensive to construct and reliable in operation.

Still a further object of my invention is to provide a circuit for measuring the amplitude of a D.C. voltage and to provide a digital output thereof.

Various other objects and advantages of the invention will become apparent from a perusal of the following specification and the drawing accompanying the same.

Figure 1A:
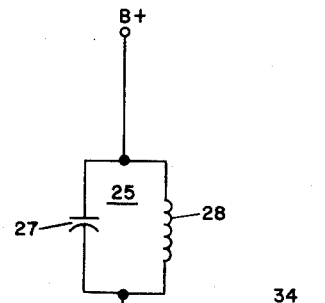
FIGURES 1A and 1B illustrate schematically the circuit of the present invention.
Figure 1A:
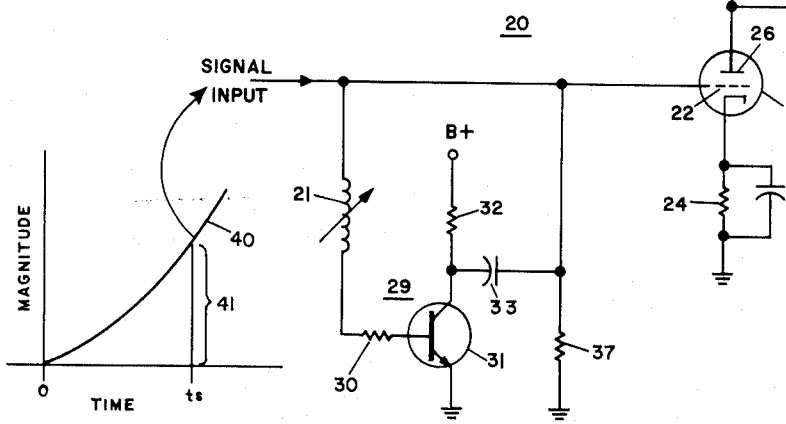

FIGURE 1A illustrates a circuit 20 wherein an exponential pulse 40 to be sampled is applied simultaneously to variable delay line 21 and to grid 22 of triode 23. Triode 23 is normally biased just to cutoff by cathode biasing resistor 24, and normally no oscillations occur in ringing circuit 25 which is connected to plate 26 of triode 23. Ringing circuit 25 comprises capacitor 27, inductor 28, and its resistance (not shown). Obviously the damping constant of ringing circuit 25 must be less than unity. When pulse 40 is applied, triode 23 starts to conduct and plate current flows according to the bias on grid 22 provided by the pulse.

Concurrently, a portion of the pulse 40 propagates through variable delay line 21 to gate circuit 29. Gate circuit 29 is here illustrated as comprising base resistor 30, transistor 31, collector resistor 32, collector capacitor 33, and resistor 37. Gate circuit 29 functions to gate off the signal pulse being applied to grid 22 of triode 23 at a time determined by the delay set into variable delay line 21, such "$t_s$" as illustrated. Those skilled in the art will understand the operation of gate circuit 29 hence an explanation thereof need not be described. Moreover, they will appreciate that various other gate circuits can be utilized to perform this function.

When the signal pulse 40 is gated off at grid 22 at time $t_s$, triode 23 is again biased to cutoff and substantially ceases to conduct. At this point a specific amount of energy has been stored in ringing circuit 25. This amount of energy is related to the peak amplitude 41 of pulse 40 as will appear hereinafter. Immediately ringing circuit 25 starts oscillating and its oscillations damp out. The number of such oscillations is similarly related to the height 41 of exponential pulse 40 at the time of sampling, $t_s$, as will be explained hereinafter. During oscillations of ringing circuit 25 the stored energy dissipates as heat.

Figure 2:
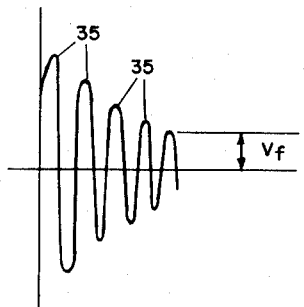
FIGURE 2 is a graph illustrating damped oscillations in the ringing circuit of FIGURE 1A.
Figure 1B:
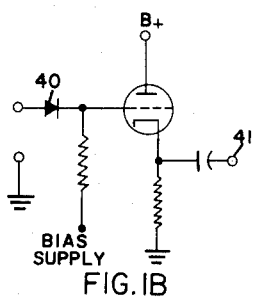

Counter 34 is connected to the output of ringing circuit 25. Its function is to count the number of damped oscillations in ringing circuit 25 until their magnitude drops to a predetermined value. Counter 34 includes an input limiter (not shown) and a discriminator that may be set to count oscillations having magnitudes exceeding a predetermined voltage value $V_f$. The limiter reduces voltage amplitudes that exceed the maximum safe input voltage of the counter. The damped oscillations 35 counted by counter 34 are illustrated in FIGURE 2. Also shown is $V_f$, the voltage set in the discriminator at which counter 34 cuts off. FIGURE 1B illustrates a typical discriminator circuit that may be used in counter 34. The term "discriminator" as used herein is defined as a circuit that distinguishes between pulses having amplitudes greater than $V_f$ and those having amplitudes less than $V_f$. In the circuit of FIGURE 1B the bias supply back biases diode 40 by a voltage equal to $V_f$ so that output pulses are produced at terminal 41 only when the amplitudes of the input pulses exceed $V_f$.

The number "N" of oscillations counted by counter 34 is related to the pulse height 41 of the pulse 40 at time $t_s$, when it was gated off by the following equation:

$$N = \frac{Q}{\pi} \ln \frac{V_p}{V_f}$$

where $N$ = the number of oscillations counted.
$Q$ = the quality of ringing circuit 25.
$V_p$ = the peak amplitude of the input pulse at time $t_s$.
$V_f$ = the voltage set in the discriminator at which counter 34 cuts off.

Figure 3:
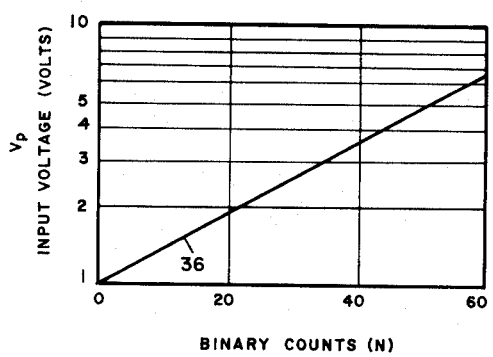
FIGURE 3 is a graph illustrating the relationship between the number of damped oscillations measured and the peak pulse height of input pulses.

An example of the relationship of N to $V_p$ for a ringing circuit 25 having a Q of 100 is illustrated by line 36 in the graph of FIGURE 3.

Obviously, a D.C. voltage may likewise be measured with the above circuit arrangement and mode of operation.

It will be appreciated by those skilled in the art that an inexpensive binary chain, limiter, and discriminator may be easily constructed to count the number "N" of damped oscillations. Further, it will be appreciated that high frequency components must be used for measurements with pulses of very short time durations so that triode 23 and ringing circuit 25 together have sufficient bandwidth to pass the pulse being measured. Moreover, pulses having very short time durations, shorter than gate-off time, may also be measured because such a pulse in essence gates itself off. In addition, the circuit of FIGURE 1A may be modified to incorporate ringing circuit 25 in the cathode circuit of triode 23 by appropriate changes.

It will be understood that various changes in the details, materials and arrangement of parts which have been herein described and illustrated in order to explain the nature of the invention may be made by those skilled in the art within the principles and scope of the invention as expressed in the appended claims.

I claim:
1. A circuit for measuring the peak voltage amplitude of a pulse of electrical energy, said circuit comprising:
   a ringing circuit having a damping constant less than unity and connected to produce damped oscillations only, when energized by said pulse of electrical energy;
   means connected to said ringing circuit for applying said pulse of electrical energy thereto; and
   a counter including a discriminator circuit connected to the output of said ringing circuit for counting the number of damped oscillations so produced therein until said counter is cut off by said discriminator circuit when the amplitude of said oscillations drops to a predetermined voltage level set in said discriminator circuit, said number of counted oscillations being related to the peak voltage amplitude of said pulse of electrical energy.

2. Apparatus for measuring the peak voltage amplitude of a pulse of electrical energy as in claim 1 in which said ringing circuit comprises a capacitor and an inductor.

3. Apparatus for measuring the peak voltage amplitude of a pulse of electrical energy as in claim 2 in which said number of oscillations is related to the peak voltage amplitude of said pulse of electrical energy by the equation $$N = \frac{Q}{\pi} \ln \frac{V_p}{V_f}$$

wherein N is the said number of oscillations, Q is the quality of the ringing circuit, $V_p$ is the peak voltage amplitude being measured and $V_f$ is the said predetermined voltage level.

4. A circuit for measuring the peak amplitude of a voltage prior to a predetermined time, said circuit comprising:
   means for deriving a pulse of electrical energy from said voltage comprising
   a high frequency triode normally biased to cutoff and connected so said voltage may be applied to its grid prior to said predetermined time, and
   means connected to said triode and adapted to gate off said voltage at said predetermined time,
   a ringing circuit connected to said deriving means, having a damping constant less than unity, and further connected to produce damped oscillations only, when energized by said pulse of electrical energy; and
   a counter including a discriminator circuit connected to the output of said ringing crcuit for counting the number of damped oscillations so produced therein until said counter is cut off by said discriminator circuit when the amplitude of said damped oscillations drops to a predetermned voltage level set in said discriminator circuit, said number of counted oscillations being related to the peak amplitude of said voltage.

5. Apparatus for measuring the peak amplitude of a voltage as in claim 4 in which said ringing circuit comprises a capacitor and an inductor.

6. Apparatus for measuring the peak amplitude of a voltage as in claim 5 in which said number of oscillations is related to the peak amplitude of said voltage by the equation $$N = \frac{Q}{\pi} \ln \frac{V_p}{V_f}$$

wherein N is the said number of oscillations, Q is the quality of the ringing circuit, $V_p$ is the peak amplitude being measured and $V_f$ is the said predetermined voltage level.

References Cited by the Examiner

UNITED STATES PATENTS 2,801,281    7/57    Oliver et al. _____ 340—347

MALCOLM A. MORRISON, *Primary Examiner.*

LLOYD W. MASSEY, *Examiner.*